United States Patent

[11] 3,607,561

[72] Inventors Gerhard Hutz
Suchteln/Rhineland;
H. J. Bongers, Huls b. Krefeld, both of Germany
[21] Appl. No. 611,626
[22] Filed Jan. 25, 1967
[45] Patented Sept. 21, 1971
[73] Assignee G. Siempelkamp & Co.
Krefeld, Germany
[32] Priority Jan. 26, 1966
[33] Germany
[31] S 101638

[54] APPARATUS FOR THE MANUFACTURE OF REINFORCED FLEXIBLE BELTS
4 Claims, 4 Drawing Figs.
[52] U.S. Cl. ........................................ 156/437, 156/137, 156/179, 156/436
[51] Int. Cl. ........................................ B29h 9/00
[50] Field of Search........................................ 156/179, 137, 303, 436, 437, 298

[56] References Cited
UNITED STATES PATENTS

| | | | |
|---|---|---|---|
| 2,512,762 | 6/1950 | Benson et al. ................ | 156/437 |
| 2,797,729 | 7/1957 | Runton.......................... | 156/436 X |
| 2,893,466 | 7/1959 | Fink ............................. | 156/179 |
| 3,239,396 | 3/1966 | Bohannon .................... | 156/436 X |

Primary Examiner—Benjamin R. Padgett
Attorney—Karl F. Ross

ABSTRACT: System for the production of steel-wire-reinforced flexible belts consisting at least of an elastomeric or synthetic-resin upper layer, a core in which the steel strands are embedded and a lower layer of such material bonded into a unitary laminate while the reinforcing strands are tensioned; the invention resides in the use of an equalizing press adapted to bond the core to the steel strands prior to the application of the upper and lower layers and the final laminating phase. A supply means for each of the outer layers is provided downstream of the equalizing press and the layer is, in turn, downstream of a further supply system adapted to sandwich the generally planar array of longitudinally extending tension steel strands between layers of the core material.

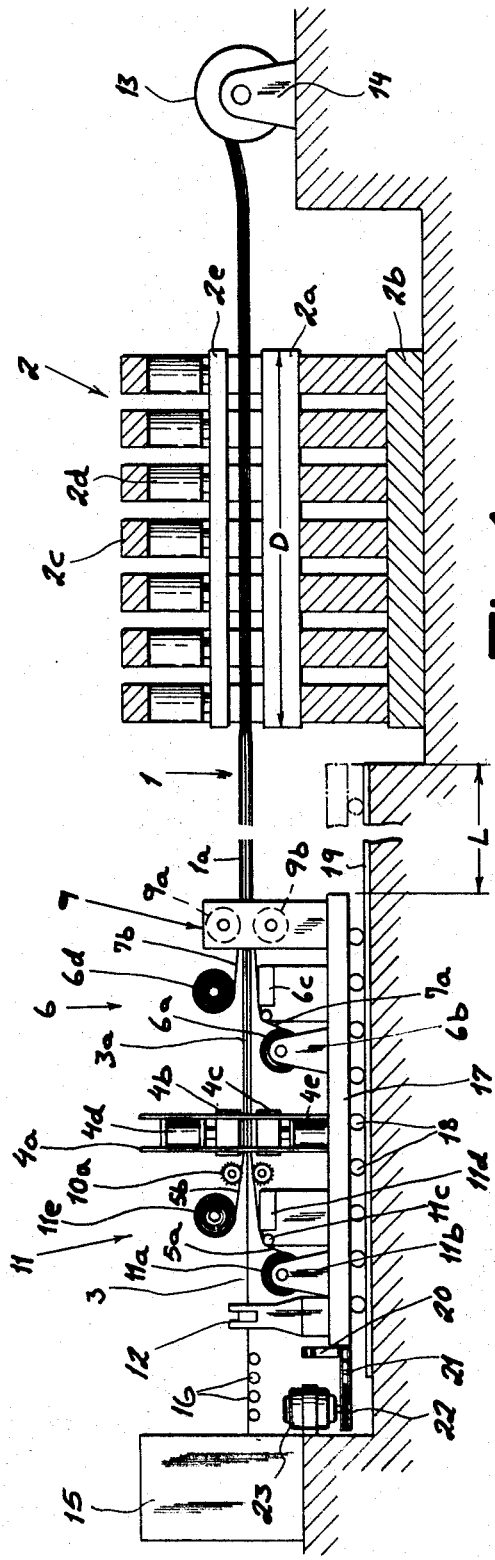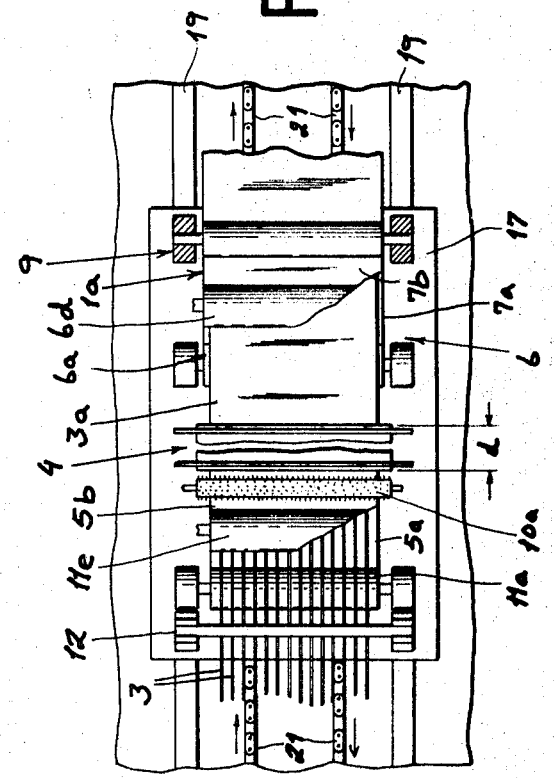

APPARATUS FOR THE MANUFACTURE OF REINFORCED FLEXIBLE BELTS

Our present invention relates to the building of conveyor belts and like flexible planar bodies for use in the delivery and transportation of goods or as driving members in transmissions and the like and, more particularly, to steel-wire reinforced bands of this character.

It has already been proposed to reinforce conveyor bands, driving belts or the like by incorporating within the band of flexible material (e.g. of an elastomer such as natural or synthetic rubber or a flexible and wear-resistant synthetic resin) a generally planar array of reinforcing strands or wires (e.g. of steel), the reinforcing strands being securely bonded to the flexible material in a vulcanizing or laminating platen-type press. In order to "build up" such belts and bands rapidly and conveniently, several laminating techniques have been proposed. Thus it has become common practice in the manufacture of built-up or laminated steel-wire reinforced belts, to transport a planar array of transversely spaced parallel wires along an elongated path at one end of which, on the discharge side of a platen press, is provided a takeup reel. At the other end of the transport path, there is a device for longitudinally stressing or pretensioning the wires to substantially the same degree and, at intermediate locations along the path, supply devices are disposed for applying an upper and a lower layer of the flexible material. The assembly of upper and lower layers and an array of reinforcing strands is then fed into the press in which the flexible layers are firmly bonded to the wire under heat and pressure with or without an adhesive composition, and often molded partly therearound. It has also been suggested that better results are obtained with a preliminary pressing of the flexible material against that array of reinforcing strands prior to the final stage of compression in the platen press.

When a core layer of elastomeric or synthetic resin material is provided substantially in the plane of the array of wires and is sandwiched between the upper and lower layers, however, it is found that various problems ensue. Firstly, the core material is generally quite different in flexibility, yieldability, resilience, compressive strength, resistance to elongation and frictional coefficient, from the outer layers. The outer layers (i.e. the upper and lower layers) are designed for maximum wear resistance and minimum slippage, whereas the core material must be somewhat more yieldable and less tough so as to permit limited movement between the outer layers and between these layers and the reinforcing strand so that substantial stresses will not arise in the belt when the latter passes around the support rollers. Furthermore, these difficulties may be made more pronounced or may result from the fact that above and below the reinforcing strands the core layer is compressed to a much greater extent than in the region between these strands. This latter difficulty appears to be of particular significance in that considerable friction wear occurs in the region of the reinforcing strands and it is precisely in these regions in which the core layer is thinner and under greater compression to increase the tendency toward wear.

It is, therefore, the principal object of this invention to provide an improved system for making conveyor belts and like reinforced flexible belts wherein the aforementioned disadvantages can be avoided and the wear of such bands decreased while the useful life of the band is increased.

This object and others which will become apparent hereinafter are attained, in accordance with this invention, by a system for the production of rubber or synthetic-resin conveyor bands having steel-wire reinforcing strands, wherein a platen press is disposed at one end of an elongated transport path for laminating a built-up band assembly together, and an equalizing press is provided between a first supply station at which core layers of the elastomeric or synthetic-resin core material are disposed on opposite sides of a planar array of steel wire, and a second supply means downstream of the equalizing press for supplying to the core outer layers of elastomeric material or synthetic resin which are subsequently bonded to the core in the platen press.

According to this invention, the equalizing press bonds the core material to the tensioned steel wires and permits a precompressed core body to be sandwiched between the outer layers. The equalizing press can be a heated or unheated platen press depending upon the physical properties of the core material. Basically, however, the platen press can be any type of compression device such as a roller press in which the pretensioned wires pass with a pair of core layers between the rollers of the press. The mechanism for covering the precompressed core layer with the outer layers can consist of a depositing drum followed by a squeezing roller assembly adapted to urge any entrapped air out of the laminate.

According to a further feature of this invention, the operating efficiency of the installation is brought to a maximum when the equalizing press has a platen length which is equal to that of the laminating platen press, the equalizing press and the platen press operating in a common cadence. It is generally more convenient to have the equalizing press span only a fraction of the core material during each stroke. In this case, the equalizing press is mounted upon a movable carriage which is shifted along the prestressed reinforcing strands through a length approximately equal to the effective length of the finishing press and the equalizing press is operated at a rate (in terms of the main press rate in strokes/minute) equal to $n=D/d$ where D is the effective length of the laminating press and $d$ is the length compressed during each stroke of the equalizing press. Advantageously, the equalizing press, the means for depositing the core material around the strands, and the supply means for applying the covering layers to the core are mounted upon a common carriage shiftable along the reinforcing strands via a chain with which the carriage can be selectively coupled and decoupled. It is also possible, however, to provide an arrangement whereby the entire apparatus is actuated hydraulically.

The above and other objects, features and advantages of this invention will become more readily apparent from the following description, reference being made to the accompanying drawing in which:

FIG. 1 is a schematic elevational view of a plant for the production of a conveyor belt, according to this invention;

FIG. 2 is a plan view of the apparatus, partly broken away;

Figure 3:
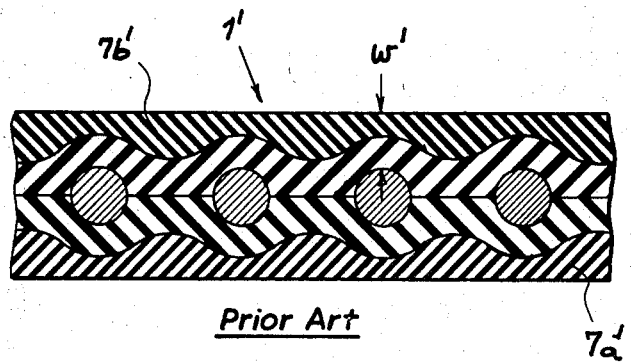
FIG. 3 is a cross-sectional view through a portion of a conventional conveyor belt.

In FIGS. 1 and 2, we show a plant for the manufacture of laminated conveyor belts and similar wire-reinforced bands which comprises a single-stage heated-platen press 2 in which a laminated built-upon assembly of layers 1 is compressed into a unitary and bonded state. The press may comprise a bedplate 2a carried by a pedestal 2b which also supports a framework 2c in which hydraulic cylinders 2d support a vertically movable platen 2e. Both the bedplate 2a and the platen 2e may be heated and of the type illustrated and described in the commonly assigned U.S. Pat. No. 3,241,189. Downstream of the press 2 in the direction of advance of the laminated belt 1, we provide a takeup drum 13 which is mounted upon a pair of trunnions one of which is shown at 14 in FIG. 1.

A generally planar array of reinforcing wires 3 is fed from a supply of tensioning device 15 to the basic elements of the apparatus, the tensioning means having weighted pulleys or other means (e.g. as illustrated in U.S. Pat. No. 2,740,459 ) for maintaining a predetermined tension of the wires 3 during the press operation in the intermittent advance of the belt. From the supply and tensioning device 15, the planar array of transversely spaced mutually parallel reinforcing wires 3 passes over a multiplicity of horizontal support rollers 16 and thence through the openings of a guide comb 12 supported upon a carriage 17. The latter is shiftable upon its wheels 18 and the support rails 19 through a distance L to deposit the several layers about the reinforcing wires 3. A lever 20 is swingable on the carriage 17 for coupling the carriage with either reach of a horizontal endless chain 21 which passes about the drive sprocket 22 and is displaced by the motor 23.

Thus the chain on one side of the carriage 17 moves forwardly in the direction of the press 2 whereas, at the other side of the carriage, it moves in the opposite direction (see arrows in FIG. 2). By selectively connecting the carriage 17 with the opposite reaches of the chain, therefore, the operator can shift the carriage 17 toward and away from the press 2.

The carriage 17 is, moreover, provided with a supply means 11 for applying the core layers to the reinforcing wires 3 upstream of an equalizing press 4 and a further supply means 6 for applying the outer layers to the core layers upstream of the equalizing press 4. As can be seen in FIG. 1, the supply means may include a lower supply reel 11c carried by trunnions 11b below the wires 3 and adapted to feed a lower core layer 5a over a horizontal guide roller 11c and a tube 11d onto the underside of the array of wires. Similarly, the upper supply roll 11e applies the upper core layer 5b to the array of reinforcing strands 3.

The equalization press 4 has a frame 4a upon which the vertically shiftable platens 4b and 4c are mounted. The platens 4b and 4c are respectively carried by hydraulic cylinders 4d and 4e adapted to compress the laminated assembly of lower core layer 5a reinforcing strand 3 and upper core layer 5b between the platens of this press.

Downstream of the equalizing press 4, we provide a station 6 for depositing the lower and upper outer layers 7a and 7b, respectively, in the laminate. Thus, the core 3a emerging from the equalizing press 4 receives lower outer layer 7a from a supply role 6a journaled on a pedestal 6b and passing over a table 6c. The upper layer 7b is applied from a supply roll 6d journaled above the core 3a. The laminate 1a (now consisting of an unbonded lower layer 7a, an integral core 3a, and an unbonded upper layer 7b ), then passes between the rollers 9a and 9b of a calendering station 9, at which air is squeezed from the laminate. Thereafter, the squeezed and degassed laminate passes between the platens 2a and 2e of the press 2. Between the supply drums 11a and 11e and the equalizing press 4, we provide respective prickle rollers 10a and 10b adapted to pierce at least partly the core layers 5a and 5b and thereby prevent air or other gases from affecting the equalizing-press and finishing-press operation.

As can be seen in FIG. 2, the equalizing-press width $d$ may be a fraction of the main-press length D in the direction of advance of the belt. In this case, the overall stroke L of the carriage 17 may be equal to the length D of the main press 2 although the carriage 17 will generally move in increments $s$ of $L/d = D/d$, where $s \times n = L$ and $n$ represents the number of strokes of the equalizing press 4 during each cycle of the finishing press 2.

The platens 4b and 4c of the equalizing press 4 may be either heated or unheated depending upon the nature of the core layers 5a and 5b. When the core layers are composed of a thermoplastic elastomer or synthetic resin, the platens 4b and 4c heated by a construction of the type shown in the aforementioned patent. It is, however, also possible to make use of self-setting adhesives which can be coated by conventional means into the inner surfaces of the layers 5a and 5b and, in this case, unheated equalizing-press platens may be employed.

As we have pointed out earlier, an important feature of this invention resides in the provision of prickle rollers 10a and 10b upstream of the equalizing press 4 in combination with the squeegy-type degassing rollers 9, downstream of the supply means 6 for applying the outer layers 7a and 7b to the core material treated by the prickle rollers.

It will also be understood that the equalizing press 4 may have a platen width $d$ in the direction of advance of the built-up or laminate assembly which is substantially equal to the corresponding length D of the main press 2. In this case, the carriage 17 may be immovable although some movability is desirable for advancing the prepressed material in the direction of the finishing press 2. When the buildup station 4–12 is immovable, the equalizing press 4 will operate at the cadence of the main press 2. When, however, the width $d$ is a fraction of the length D of the main press, the equalizing press 4 will be required to operate at a cadence $n$ times greater than that of the main press where $n = D/d$.

Figure 4:
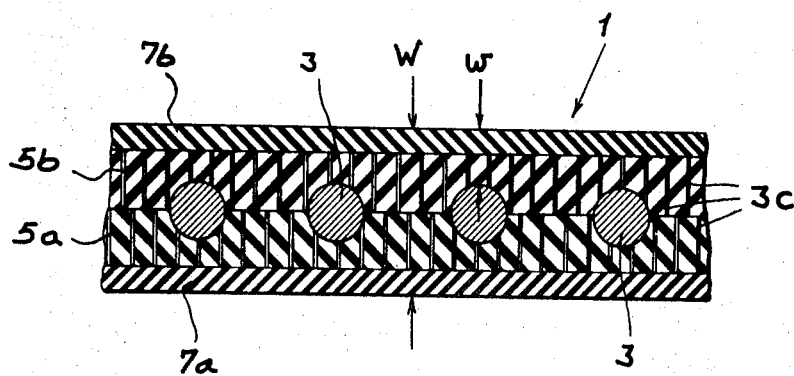
FIG. 4 is another cross-sectional view through a portion of a conveyor belt manufactured in accordance with the invention.

Referring now to FIG. 4, it can be said that the lower layer 7a and the upper layer 7b flank a core 3a built up by sandwiching a lower core layer 5a and an upper core layer 5b about tensioned metallic wires 3. The core 3a is perforated as represented at 3c by the prickle rollers 10a and 10b such that no air or other gas is trapped within the core or within the belt proper. Both the core 3a and the finished belt 1 have uniform core sections and throughout the wall sections of the outer layers 7a and 7b remain the same. The outer layers 7a and 7b of course constitute friction and wear surfaces, such that the wear is uniform over all portions of these surfaces. The equalizing process insures that the elasticity in the narrow region $w$, for example, is not substantially different from the elasticity at certain locations than in others. In the regions $w'$, for example, the thickness of the layers 7a' and 7b' is relatively meager and wears rapidly, resulting in deterioration and destruction of the belt. We have discovered that in the absence of an equalizing process as here described, belts invariably appear to take on the form illustrated in FIG. 3 as a result of the final compression When, however, an equalizing pressing is employed prior to the application of the outer members, these outer members retain a uniform c cross section even after the final vulcanizing and pressing stage.

We claim:

1. An apparatus for the production of a reinforced band comprising:
    means for advancing a planar array of generally parallel reinforcing strands along a transport path;
    first supply means along said path for applying an elastomeric core layer to each side of said array;
    an equalizing platen press downstream of said first supply means and having planar-faced platens clamping said core layers and said array bonding said core layers to said strands and forming a flat core between them thereby;
    second supply means downstream of said equalizing platen press sandwiching said core between a pair of elastomeric outer layers; an
    a laminating platen press downstream of said second supply means for bonding said outer layers to said core.

2. The improvement defined in claim 1 further comprising:
    prickle roller means between said first supply means and said equalizing press for at least partly perforating the core layer bonded to said array in said equalizing press; and
    degassing roller means between said second supply means and said laminating press for squeezing the laminate to expel any trapped gas therefrom prior to compression in said laminating press.

3. The improvement defined in claim 1 wherein said equalizing press has a width equal to a fraction of the length of said laminating press, further comprising means for movably supporting said equalizing press for movement in the major direction of the band.

4. The improvement defined in claim 3 wherein said for movably supporting said equalizing press means includes a common carriage for first supply means, said equalizing press and said second supply means.